United States Patent [19]
Noyes et al.

[11] Patent Number: 6,103,109
[45] Date of Patent: Aug. 15, 2000

[54] WASTEWATER TREATMENT SYSTEM

[76] Inventors: Dan G. Noyes, 1709 Crestdale, Houston, Tex. 77080; Louis H. Knieper, 5819 N. Magazine Cir., Houston, Tex. 77084; Gary A. Tipton, 507 N. Belt East #550, Houston, Tex. 77060

[21] Appl. No.: 09/328,255

[22] Filed: Jun. 8, 1999

Related U.S. Application Data

[60] Provisional application No. 60/088,589, Jun. 9, 1998.

[51] Int. Cl.$^7$ ..................................................... C02F 3/30
[52] U.S. Cl. ..................... 210/151; 210/177; 210/195.1; 210/202; 210/260; 210/274
[58] Field of Search ........................... 210/605, 615–617, 210/150, 151, 177, 195.1, 195.3, 201, 202, 203, 220, 256, 258, 260–262, 274

[56] References Cited

U.S. PATENT DOCUMENTS

| | | | |
|---|---|---|---|
| 3,260,366 | 7/1966 | Duff et al. | 210/80 |
| 3,773,660 | 11/1973 | Hopwood | 210/151 |
| 3,850,801 | 11/1974 | Pearson | 210/151 |
| 3,869,381 | 3/1975 | Graveland et al. | 210/205 |
| 4,008,159 | 2/1977 | Besik | 210/195.1 |
| 4,065,391 | 12/1977 | Farabaugh | 210/274 |
| 4,202,774 | 5/1980 | Kos | 210/274 |
| 4,720,347 | 1/1988 | Berne | 210/274 |
| 4,931,183 | 6/1990 | Klein et al. | 210/151 |
| 5,207,905 | 5/1993 | O'Brien et al. | 210/274 |
| 5,484,524 | 1/1996 | MacLauren et al. | 210/195.3 |
| 5,582,719 | 12/1996 | Nagano | 210/151 |
| 5,667,670 | 9/1997 | Drewery | 210/202 |
| 5,843,305 | 12/1998 | Kim et al. | 210/151 |

OTHER PUBLICATIONS

A Unique Biological Treatment System for Small Plants, Presented at the 50$^{th}$ Water Pollution Control Federation Conference in Philadelphia, Pennsylvania, Oct. 1977.

*Primary Examiner*—Thomas G. Wyse
*Attorney, Agent, or Firm*—Keeling Law Firm

[57] ABSTRACT

A wastewater treatment system which comprises a tank having defined therein an aerobic treatment zone and a suspended micromedia zone. One embodiment further includes an anaerobic treatment zone. The suspended micromedia zone includes a separating media. Substantially continuous aeration is provided to energize the separating media and cause it to be stirred up into a water column within the tank. The air flow provides partial suspension of the separating media and imparts continual upward motion to the wastewater in such zone. A chimney is provided above a portion of the suspended micromedia zone and extends above the aerobic treatment zone. The mixed liquid and air rising due to the aerator air flow travels within the chimney into the aerobic treatment zone. Some separating media also travels within the chimney into the aerobic treatment zone. Aerobic bacteria is provided in the aerobic treatment zone external of the chimney. After percolating through the aerobic bacteria, the wastewater is returned back to the suspended micromedia zone. An underdrain zone receives water which has percolated downward through the suspended micromedia zone and has been thereby clarified. Underdrain zone is in fluid communication with a tank outlet.

19 Claims, 4 Drawing Sheets

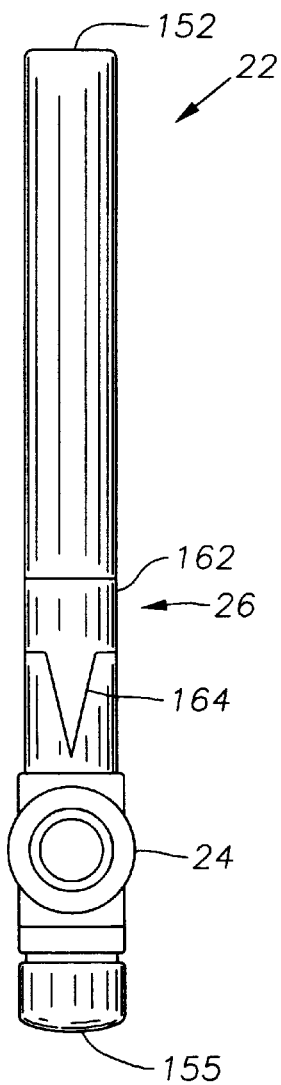
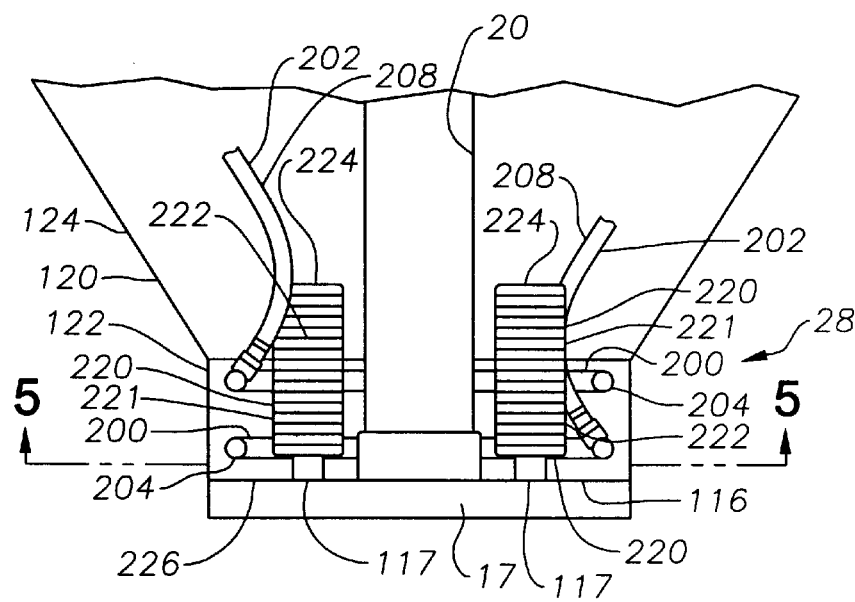
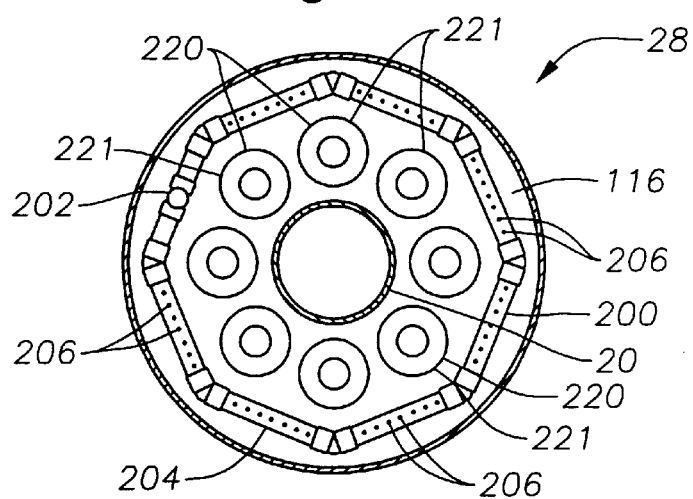

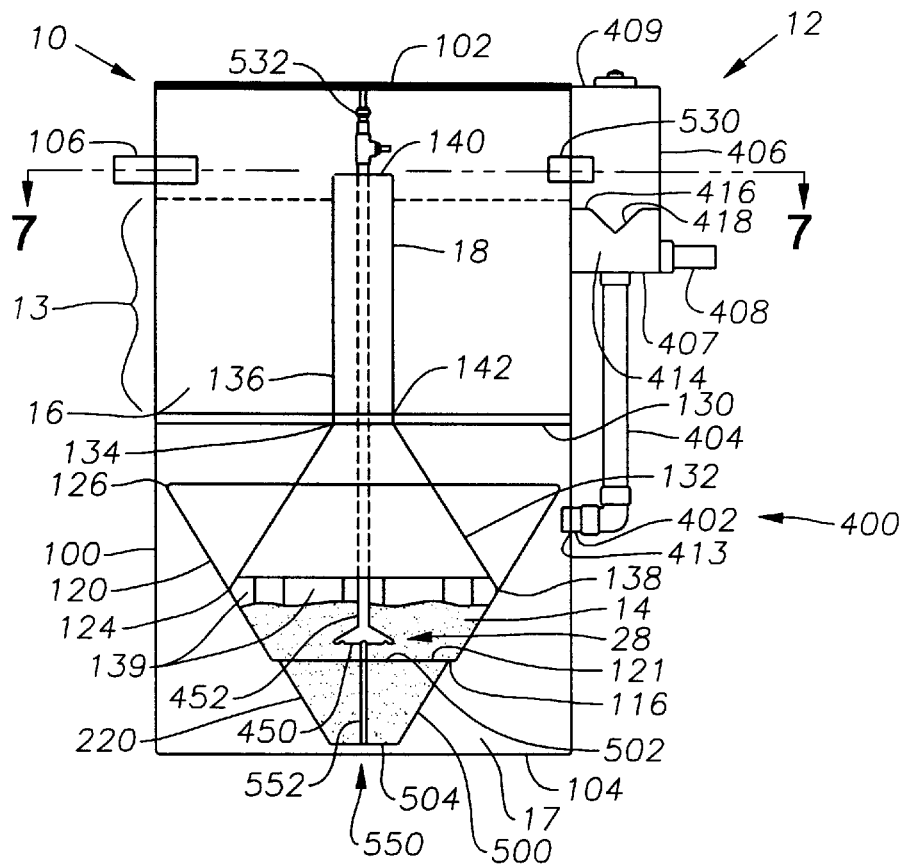
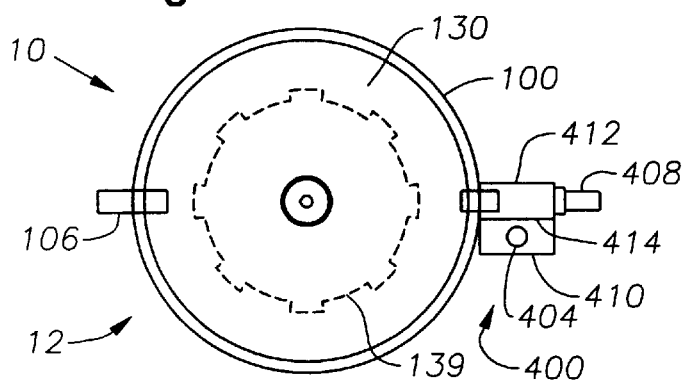
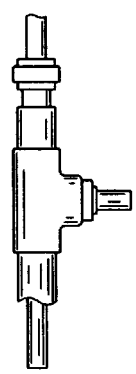
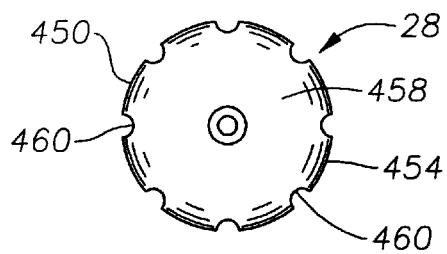
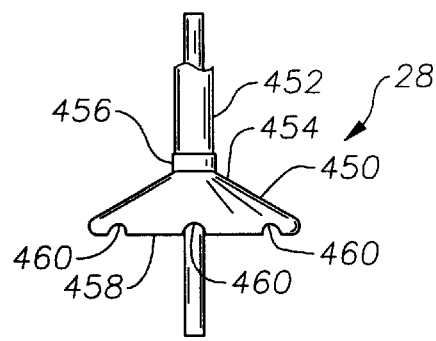

WASTEWATER TREATMENT SYSTEM

This application claims the benefit of U.S. Provisional Application Ser. No. 60/088,589 filed on Jun. 9, 1998 by Tipton, Knieper, and Noyes.

BACKGROUND OF THE INVENTION

1. Field of Invention

This invention relates generally to the treatment of nontoxic wastewater, including water-borne waste material from residential, commercial and other sources, and particularly to an improved system for activated sludge wastewater treatment.

Wastewater treated by conventional wastewater treatment systems contains soluble, partially soluble and insoluble material as well as contaminates. Materials in the wastewater may be decomposable, partially decomposable or not decomposable. Decomposable and partially decomposable materials are referred to as biodegradable; that is, the material may be biologically broken down, or stabilized by bacterial action. Wastewater treatment systems are designed to provide controlled decomposition of wastes to reduce pollution, health hazards and offensive odors.

Decomposable material is stabilized in wastewater treatment systems by bacteria, protozoa, and other microorganisms. Bacterial consumption of material, creating energy and reproducing bacterial cells, is the foundation of activated sludge wastewater treatment.

Conventional wastewater treatment systems may include pretreatment, primary treatment, secondary treatment, and advanced treatment.

Pretreatment includes screening, comminuting (mechanical cleaning of screens by shredding solids to a size which can pass through screen openings), degritting, and grease and scum removal.

Primary treatment includes removal of suspended solids from wastewater by clarification and skimming, typically involving a tank or channel, reducing flow velocity, settling of heavier solids and skimming of relatively light solids. Primary treatment may include anaerobic digestion processes, aerobic digestion processes, or a combination thereof. Primary treatment systems typically include sludge collection mechanisms, sludge suction devices, grit removal devices, and sludge dewatering devices to reduce the volume of sludge to be disposed.

Secondary treatment systems are typically aerobic systems including an aeration phase and a clarification phase. Secondary treatment systems typically include an aeration tank, an air distribution system, a clarifier, sludge collection mechanisms, and sludge removing devices.

Advanced treatment includes further removal of suspended and dissolved organic solids by means including filtration, removal of pathogens and chloroforms by oxidation, chlorination or heating, precipitation of minerals, adsorption or other methods.

In the activated sludge process of primary or secondary treatment, microorganisms are contained in an activated sludge and mixed with incoming wastewater; the wastewater providing food for the microorganisms. Such mixing is accomplished in an aeration tank or channel. In the aerobic activated sludge process, oxygen is intimately mixed with the activated sludge and the wastewater, the microorganisms converting suspended organic solids into energy, carbon dioxide, water, and additional microorganism cells. The aerobic activated sludge process therefore typically includes (i) mixing of wastewater, activated sludge, and oxygen in an aeration tank, (ii) converting suspended organic solids, (iii) settling of activated sludge in the clarifier, (iv) returning the activated sludge to the aeration tank for further treatment, (v) removing purified liquor from the clarifier, and (vi) removing and disposing of the final, inert sludge.

In the further process of advanced treatment, the purified liquor from the clarifier is typically filtered. The filtered liquor is refined through chlorination, oxidation, or heating.

Current technology is generally practiced in relatively large plants providing wastewater treatment for communities. Various attempts have been made to develop a practical treatment system for use in individual applications or applications for relatively small communities.

Relatively small plants have not been economical to construct due to the requirement that the plant be designed to handle the maximum volume of waste that may require treatment from time to time, which maximum volume substantially exceeds the normal volume of wastewater. This results in a requirement to construct plants having substantially higher capacity than is normally needed. This problem is reduced in plants serving relatively large communities due to diversity of wastewater treatment requirements.

Current technology used in the design of activated sludge wastewater treatment plants provides a high amount of process control. Conventional design of such plants, however, requires the use of a large number of mechanical subsystems including pumps, blowers, gears, chains, and associated mechanical elements. The large quantity of mechanical parts makes such conventional systems expensive to construct and maintain as well as difficult to operate.

2. Related Art

Wastewater systems that attempt to improve various aspects of wastewater treatment are known to the prior art. Valdespino U.S. Pat. No. 3,220,706 discloses a sewage treatment system comprising, in combination, an aeration unit including a generally circular tank, a tangentially disposed adjustably-sized sewage inlet located along the wall of the tank, an overflow discharge line, a circulating pump, vertically adjustable air inlet means requiring blowers or compressors in the middle of said tank spaced from the bottom of the tank, blowers and a liquid spray ring around the upper interior portion of the tank having downwardly-directed orifices. Sewage introduced into the tank through tangential inlets rotates. Compressed air from the air inlet induces movement in the sewage vertically at right angles to the sewage rotation, resulting in rolling, swirling flow and exposure of sewage with oxygen in the air. The Valdespino disclosure includes a sump, an aeration tank, a settling tank, a sludge digestion tank, and various valves, blowers, and pumps connecting the various tanks.

Drewery U.S. Pat. No. 5,667,670 discloses a wastewater system including a pretreatment tank for aeration and activated sludge treatment, a wastewater tank, a sand filter, a T-filter for filtering sand or silica particles, a filtered water retaining chamber, and associated valves piping and controls. The filtered water retaining chamber includes a bladder utilized for backwashing the sand filter.

O'Brien U.S. Pat. No. 5,207,905 discloses a baffle system for a media filter bed that is backwashed by a turbulent stream.

Farabaugh U.S. Pat. No. 4,065,391 discloses fluid distributors for providing uniform distribution of a fluid throughout a bed of granular material.

Kos U.S. Pat. No. 4,202,774 discloses a flow distributor including means for decreasing velocity of fluid streams in a fluid bed biological reactor.

J. H. Duff, et al., U.S. Pat. No. 3,260,366 discloses apparatus for cleaning a filter bed including means for entraining gas in raw liquid, a filter chamber, a chamber including a filter bed and a gas space above the filter bed, and a tank for filtered liquid mounted above the chamber containing the filter bed.

Berrie U.S. Pat. No. 4,720,347 discloses apparatus for continuously filtering a suspension involving a granular filtrating with the suspension flowing though the granular filtrating mass as a vertical ascending current.

SUMMARY OF THE INVENTION

Objectives of the present invention are to provide, inter alia, a wastewater treatment system that:

provides for anaerobic treatment, aerobic treatment, and filtration of wastewater in a single unit;

eliminates the need for a clarification stage;

provides a suspended micromedia zone for separating mixed liquor particles from the water;

allows for selective sludge removal;

provides controlled, continuous aerating flow within the aerating treatment zone;

minimizes the number of operating parts in the system; and provides a compact design.

To achieve my objectives, my invention is a wastewater treatment system which comprises a tank having defined therein an aerobic treatment zone and a suspended micromedia zone. Such system further includes an inlet and an outlet. In one embodiment, the system further comprises an anaerobic treatment zone with the inlet providing a supply of wastewater into the anaerobic zone of the tank. The anaerobic zone is located proximate the bottom of the tank. In other embodiments, the inlet feeds wastewater into the tank so that the wastewater flows eventually into the suspended micromedia zone.

The suspended micromedia zone, which includes a separating media, is provided in a lower central zone of the tank. Substantially continuous aeration is used to energize the separating media and cause it to be expanded with apparent specific gravity gradients up into a water column within the tank. In the relevant embodiment, the suspended micromedia zone is separated from the anaerobic zone by a partially inclined wall.

Overflow of wastewater from the anaerobic zone (in the relevant embodiment) together with flow from the aerobic zone proceed to the suspended micromedia zone. Air flow from aerators within the suspended micromedia zone provide partial suspension of the separating media and impart continual upward motion to the wastewater in such zone.

A chimney is provided above a portion of the suspended micromedia zone and extends above the aerobic treatment zone. The mixed liquid and air rising due to the aerator air flow travels within the chimney into the aerobic treatment zone. Some separating media also travels within the chimney into the aerobic treatment zone.

Aerobic treatment zone includes aerobic bacteria and is external of the chimney. In some embodiments, a fixed media is provided for the aerobic bacteria to grow thereon.

After percolating through the fixed media, the wastewater is returned back to the suspended micromedia zone below such media. The separating media which percolates through the fixed media scours the old growth bacteria accelerating new bacteria growth.

An underdrain zone receives water which has percolated downward through the suspended micromedia zone and has been thereby clarified. Underdrain zone is in fluid communication with a tank outlet. In one embodiment, hydrostatic pressure, created by the difference in vertical height between the inlet and the tank outlet, forces the clarified water out of the underdrain zone, and out of the tank by way of the tank outlet. In another embodiment, gravity forces the clarified water out of the underdrain zone and out of the tank by way of the tank outlet.

BRIEF DESCRIPTION OF THE DRAWINGS

The manner in which these objectives and other desirable characteristics can be obtained is explained in the following description and attached drawings in which:

FIG. 3 is an elevational view of FIG. 2 of the vertical line with the weir located thereon.

FIG. 4 is an elevational view of one embodiment of the means for aerating located interior of the tank.

FIG. 5 is a cross-sectional view taken along line 5—5 of FIG. 4.

FIG. 6 is a partial cross-sectional, elevational view of another embodiment of the wastewater treatment system of the present invention.

FIG. 7 is a cross-sectional view taken along line 7—7 of FIG. 6.

FIG. 8 is an elevational view of another embodiment of the means for aerating.

FIG. 9 is a bottom view of the means for aerating of FIG. 8.

DETAILED DESCRIPTION OF THE INVENTION

Figure 1:
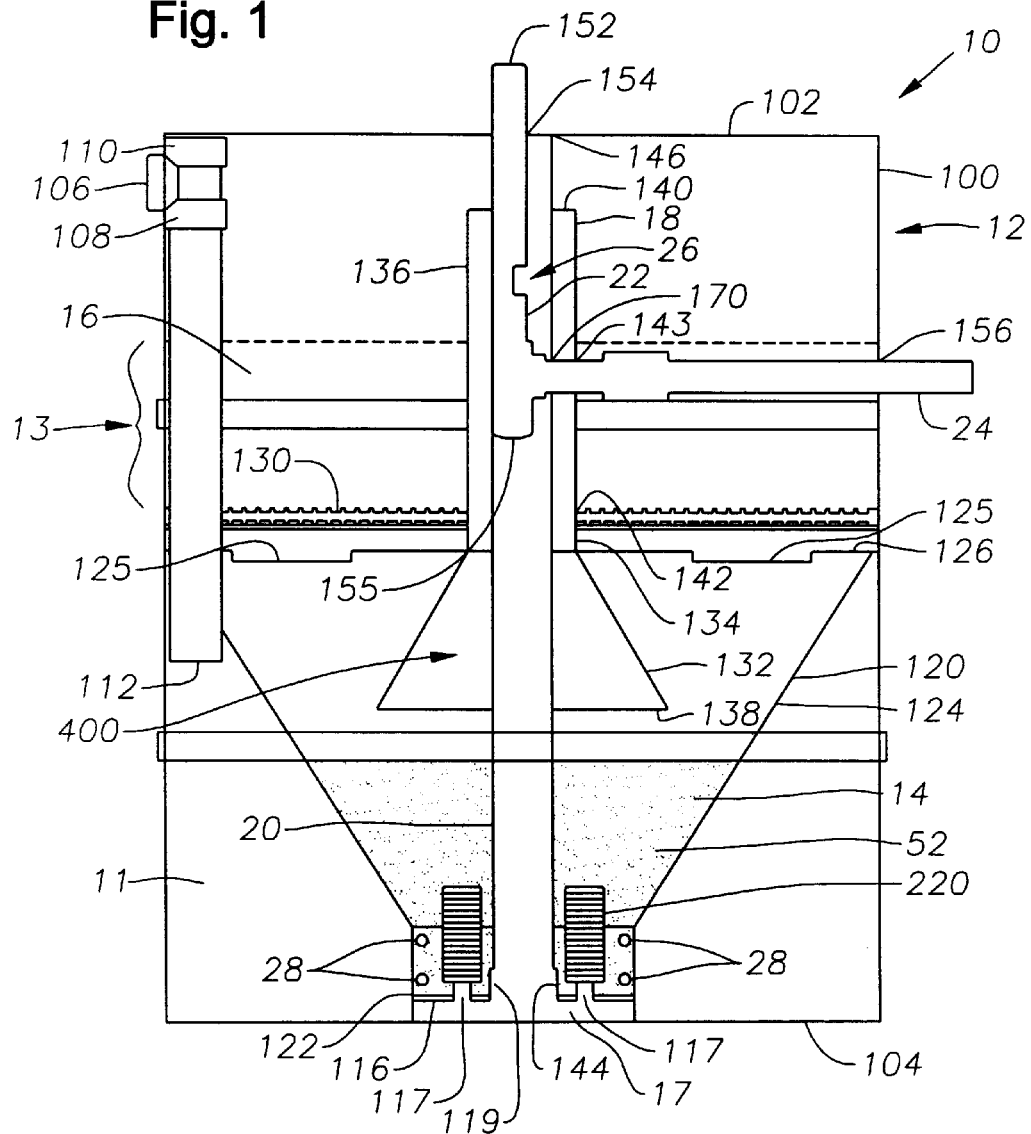
FIG. 1 is a partial cross-sectional, elevational view of one embodiment of the wastewater treatment system of the present invention.

The preferred embodiments of my invention are illustrated in FIGS. 1 through 11 and the wastewater treatment system is depicted as 10. As shown in the Figures, the wastewater treatment system 10 generally includes a tank 12, an aerobic treatment zone 13, a suspended micromedia zone 14, a means for aerating 28, and a media retaining mechanism 220. In one embodiment (see FIG. 1), system 10 also comprises an anaerobic treatment zone 11. Alternative embodiments of system 10 exist, but each functions essentially in the same manner.

Generally, wastewater is introduced into tank 12. Wastewater may encompass any type of waste containing waste solids and waste liquids, including transportable liquid waste and sewerage waste. In the embodiment including anaerobic treatment zone 11 (see FIG. 1), wastewater flows from the inlet line 106 to the anaerobic treatment zone 11, whose overflow is received by the suspended micromedia zone 14. In the embodiment not including anaerobic treatment zone 11 (see FIGS. 6, 10, and 11), wastewater flows from inlet line 106 eventually into suspended micromedia zone 14, which includes separating media 52. Suspended micromedia zone 14 is in fluid communication with aerobic treatment zone 13. Means for aerating 28 injects air bubbles into suspended micromedia zone 14 agitating the separating media 52 and creating a flow of wastewater and air bubbles from suspended micromedia zone 14 to aerobic treatment zone 13. The energy in the flow of wastewater and air bubbles generated by means for aerating 28 causes at least some separating media 52 to also flow into aerobic treatment zone 13.

Aerobic treatment zone 13 includes aerobic treatment bacteria, which are oxygenated by the air bubbles from the means for aerating 28. As the wastewater flows through aerobic treatment zone 13, the wastewater contacts the aerobic treatment bacteria, which act to decompose the solids found in the wastewater. After flowing through aerobic treatment zone 13, the wastewater recirculates back into and through suspended micromedia zone 14.

Some of the wastewater within suspended micromedia zone 14 is not carried to aerobic treatment zone 13, but instead percolates downward through the separating media 52 being clarified thereby. Media retaining mechanism 220 receives the wastewater that has percolated through suspended micromedia zone 14, prohibiting the passage of separating media 52, but allowing the passage of liquid wastewater. The liquid wastewater that passes through media retaining mechanism 220 is clarified wastewater or clarified water.

As shown in FIGS. 1, 6, 10, and 11, tank 12 is designed to receive and hold a quantity of wastewater (not shown) for treatment. Tank 12 generally comprises a side wall 100, a top 102 and a bottom 104. The top 102 and bottom 104 are sealingly engaged to side wall 100. Preferably, top 102 is selectively disengageable from tank 12. In the preferred embodiment shown, the tank 12 is generally cylindrical; however, the principles demonstrated herein may be accomplished by a tank 12 of various shapes. In one embodiment as shown in FIG. 1, bottom 104 extends outwardly from the tank wall 100. Upon installation below ground, earth or like matter (not shown) above the outwardly-extending portion of bottom 104 prevents the tank 12 from floating.

Generally, an inlet line 106 provides fluid communication between the exterior and interior of tank 12. In the embodiment of system 10 including an integral anaerobic treatment zone 11 (see FIG. 1), inlet line 106 is connected to inlet pipe 108 proximal to top 102 of tank 12. In the preferred embodiment, inlet pipe 108 extends from inlet pipe upper end 110, which is located substantially adjacent to tank top 102, generally vertically downward within tank 12 to inlet pipe lower end 112, which is located proximal to tank bottom 104. In an alternative embodiment (not shown), inlet pipe 108 extends from inlet pipe upper end 110 above top 102, through top 102, generally vertically downward within tank 12, and to inlet pipe lower end 112 proximal tank bottom 104. In one embodiment, a removable cap (not shown) is provided on pipe upper end 110. Inlet line 106 and inlet pipe 108 allow for introduction of wastewater to be treated into tank 12 at anaerobic treatment zone 11. Thus, in the embodiment shown in FIG. 1, inlet pipe lower end 112 is in fluid communication with anaerobic treatment zone 11.

Suspended micromedia zone 14 is preferably positioned centrally of tank 12 proximal tank bottom 104 and is supported above tank bottom 104 by support floor 116. The area defined between tank bottom 104 and support floor 116 is the clarified water zone 17, as will be explained herein. In the embodiment shown in FIG. 1, clarified water zone 17 is further bound by containment wall 120. In the embodiment shown in FIG. 6, clarified water zone 17 is further bound by containment wall 120 and tank side wall 100. In the embodiment shown in FIGS. 10 and 11, clarified water zone 17 is further bound by tank side wall 100.

Suspended micromedia zone 14 includes a granular separating media 52, such as ceramic beads, crushed glass, sand, inert particles, etc. In part, suspended micromedia zone 14 acts as a suspended micromedia mixing and separating unit and separates suspended solid particles from water.

In the embodiment shown in FIG. 1 which includes an integral anaerobic treatment zone 11, suspended micromedia zone 14 is separated from anaerobic zone 11 by containment wall 120. In the preferred embodiment shown, containment wall 120 is circular and extends upward from tank bottom 104. Containment wall 120 includes a vertical segment 122 sealingly attached to the tank bottom 104 and an inclined segment 124 connected to vertical segment 122. Inclined segment 124 is inclined outwardly from the center of tank 12 toward tank wall 100. The outer edge 126 of inclined segment 124 extends to tank wall 100. At various places along the length of the inclined segment outer edge 126, containment wall 120 includes gaps 125 which provide fluid communication between anaerobic zone 11 and the interior of containment wall 120, including suspended micromedia zone 14. Containment wall 120 and tank wall 100 thus define anaerobic treatment zone 11. In the preferred embodiment shown, anaerobic treatment zone 11 comprises an annular space between containment wall 120 and tank wall 100.

In the embodiment shown in FIG. 6, containment wall 120 includes only inclined segment 124 which inclines outwardly from center of tank 12 toward tank side wall 100. The outer edge 126 of inclined segment 124 extends to tank side wall 100. Unlike the embodiment shown in FIG. 1, the embodiment shown in FIG. 6 does not contain gaps 125 on outer edge 126. As previously disclosed, the space bound by tank side wall 100 and containment wall 120 is defined as the clarified water zone 17 in this embodiment.

Aerobic treatment zone 13 includes aerobic treatment bacteria therein. In some embodiments, aerobic treatment zone 13 also includes fixed media 16 therein. Fixed media 16 is supported on media support 130. Fixed media 16 comprises substantially rigid material having sufficient voids to allow vertical and lateral flow therethrough. Fixed media 16 may comprise a variety of shapes and preferably has a relatively large amount of surface area to support the growth of aerobic bacteria thereon (not shown). It is noted that many forms of material providing voids for vertical and lateral flow therethrough, including rocks, may be suitable for use as fixed media 16. Media support 130 preferably comprises a grate supporting fixed media 16 thereon. Media support 130 is provided with sufficient voids (not shown) to allow vertical flow therethrough.

Figure 10:
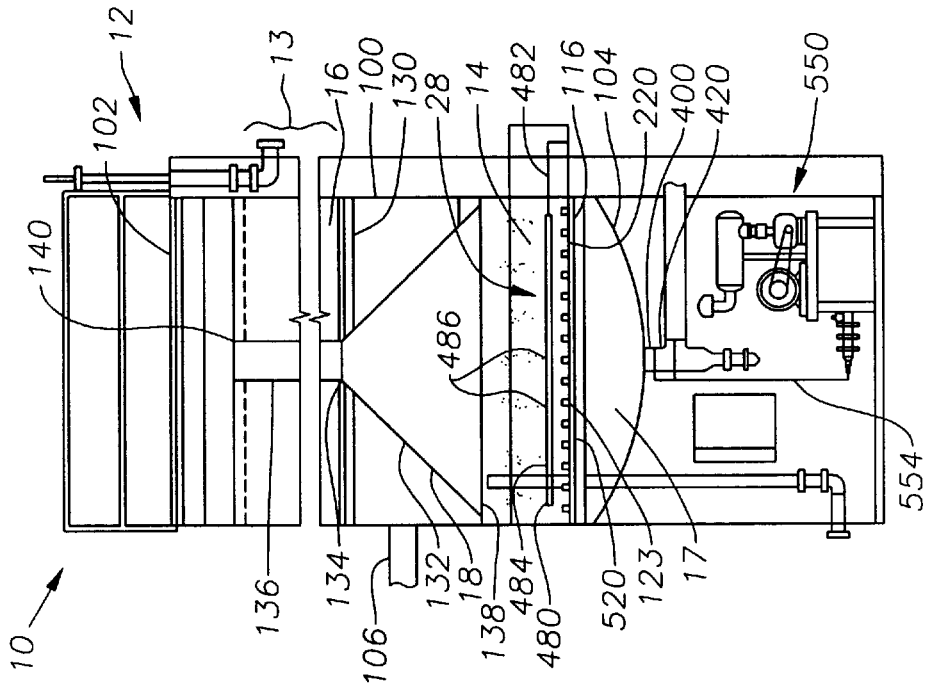
FIG. 10 is a partial cross-sectional, elevational view of another embodiment of the wastewater treatment system of the present invention.

In the embodiments of system 10 shown in FIGS. 1, 6, and 10, aerobic treatment zone 13 is located interior to tank 12. Preferably, in these embodiments, aerobic treatment zone 13 is provided in tank 12 above and spaced from suspended micromedia zone 14. Media support 130 preferably comprises a grate extending laterally throughout the interior of tank 12. In the preferred embodiment, media support 130 is attached to and supported by tank side wall 100 by well-known means.

Figure 11:
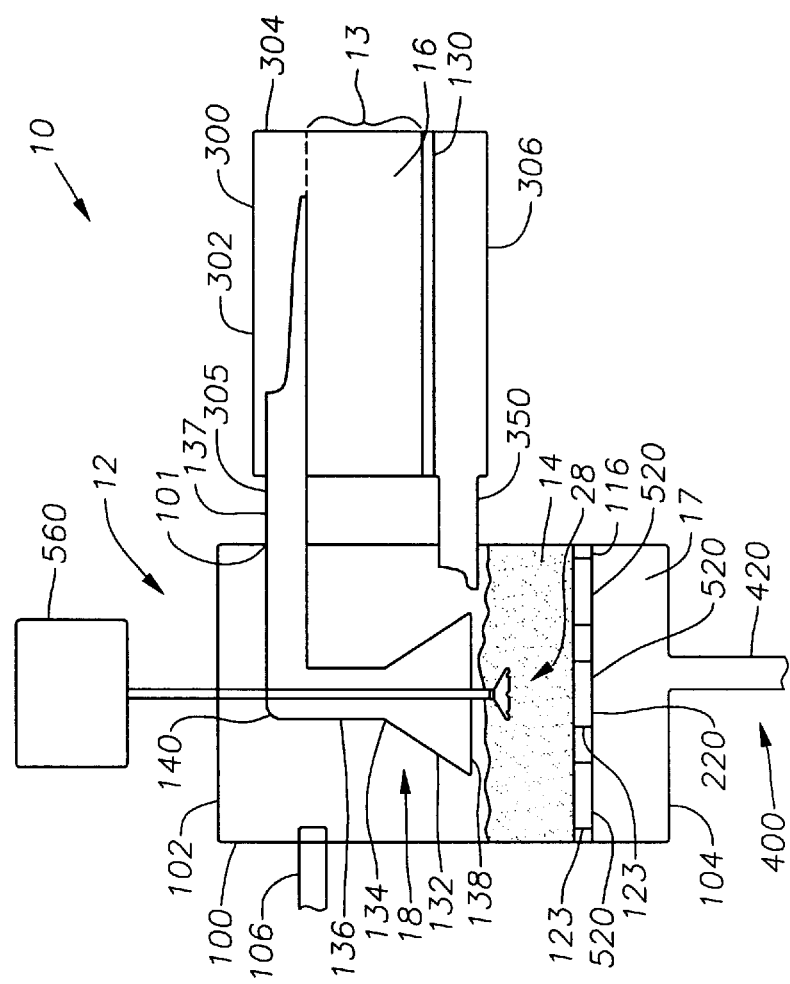
FIG. 11 is a partial cross-sectional, elevational view of another embodiment of the wastewater treatment system of the present invention.

In the embodiment of system 10 shown in FIG. 11, aerobic treatment zone 13 is located exterior to tank 12, preferably in a separate container 300. Container 300 includes a container top 302, a container side wall 304, and a container bottom 306. Media support 130 preferably comprises a grate extending laterally throughout the interior of container 300. In the preferred embodiment, media support 130 is attached to and supported by container side wall 304 by well-known means.

Chimney 18 is provided internally of tank 12. Chimney 18 includes a lower frustoconical hood 132 connected at its upper, narrow end 134 to an upper, hollow cylinder 136. Chimney 18 is, in the preferred embodiment shown, located concentrically within tank 12. Chimney 18 is located above and is spaced from suspended micromedia zone 14.

In the embodiments shown in FIGS. 1, 10, and 11, the lower, outer edge 138 of hood 132 is located above and is spaced from suspended micromedia zone 14. In the embodiment shown in FIG. 6, the lower, outer edge 138 of hood 132 extends towards, contacts, and is attached to containment wall 120. In this embodiment (FIG. 6), hood 132 includes hood gaps 139 at its outer edge 138, which hood gaps 139 provide fluid communication between the interior and exterior of hood 132.

In the embodiments shown in FIGS. 1, 6, and 10, the upper edge 140 of upper hollow cylinder 136 extends above fixed media 16. Chimney 18 extends through opening 142 of media support 130. In the preferred embodiment shown, chimney 18 is supported by media support 130 by attachment means known in the art (not shown) such as welding.

In the embodiment shown in FIG. 11, the upper edge 140 of upper hollow cylinder 136 is in communication with a lateral conduit 137 that extends from hollow cylinder 136 through a tank side wall opening 101, through a container side wall opening 305, and into container 300. Preferably, lateral conduit 137 extends into container 300 above fixed media 16. Thus, lateral conduit 137 provides fluid communication between hollow cylinder 136 and container 300. In another preferred embodiment (not shown), a horizontal tray extends and provides fluid communication between upper hollow cylinder 136 and container 300, preferably above fixed media 16. In this embodiment, system 10 also includes a return line 350 extending between container 300 proximate container bottom 306 and the interior of tank 12. Preferably, return line 350 extends into the interior of tank 12. Also preferably, return line 350 extends into tank 12 so as to be spaced above suspended micromedia zone 14.

In each of the embodiments, tank 12 includes a tank outlet 400, which provides fluid communication between clarified water zone 17 and the exterior of tank 12. Tank outlet 400 has different embodiments.

In the embodiment of tank outlet 400 shown in FIG. 1, tank outlet 400 comprises a vertical pipe 20, a vertical line 22, and an outlet line 24. Vertical pipe 20 is provided in tank 12. Vertical pipe bottom 144 is supported on and is sealingly engaged to support floor 116. Vertical pipe bottom 144 is proximal to, but spaced from, tank bottom 104. In addition, vertical pipe 20, at vertical pipe bottom 144, is in fluid communication with the clarified water zone 17. Thus, support floor 116 must include a support floor opening 119 enabling such a fluid communication connection. In an alternative embodiment (not shown), pipe bottom 144 may be supported on tank bottom 104 and provided with sufficient holes to allow fluid communication between the interior of vertical pipe 20 and the clarified water zone 17. Preferably, vertical pipe 20 is located concentrically within tank 12 and chimney 18.

In the preferred embodiment, the upper end 146 of vertical pipe 20 substantially abuts tank top 102. In an alternative embodiment (not shown), at the upper end 146 of vertical pipe 20, a flange is attached to vertical pipe 20. Such flange is provided with a central opening to allow vertical line 22 to extend therethrough. Such flange extends laterally outward from vertical pipe 20.

Vertical line 22 extends from an upper end 152 above tank top 102 through an access opening 154 of top 102 into tank 12. Vertical line 22 lower end 155 is positioned intermediate vertical pipe upper end 146 and vertical pipe lower end 144. Preferably, vertical line lower end 155 is positioned intermediate vertical pipe upper end 146 and media support 130. Outlet line 24 is connected to vertical line 22 proximate to vertical line lower end 155. In the preferred embodiment shown, outlet line 24 extends laterally from vertical line 22 through opening 170 of vertical pipe 20, through opening 143 of chimney 18, and through opening 156 of tank wall 100. In one embodiment (not shown), a removable cap is provided on vertical line upper end 152.

Figure 2:
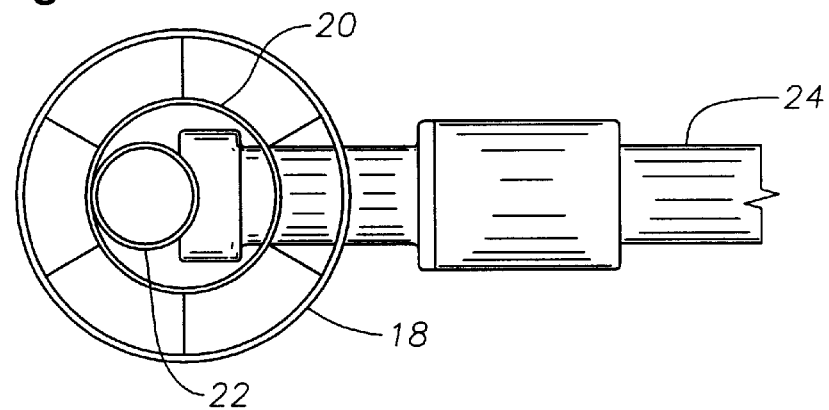
FIG. 2 is a top view of FIG. 1 of the relative position of the chimney, the vertical pipe, the vertical line, and the outlet line in a preferred embodiment.

In the preferred embodiment, vertical line 22 is located eccentrically within vertical pipe 20. FIG. 2 illustrates the relative position of chimney 18, vertical pipe 20, vertical line 22, and outlet line 24. As may be seen, vertical pipe 20 and chimney 18 are concentrically arranged and vertical line 22 is eccentrically arranged thereto with vertical line 22 located interior of a portion of vertical pipe 20 and vertical pipe 20 located interior of chimney 18.

Vertical line 22 includes a weir 26 positioned intermediate vertical line upper end 152 and outlet line 24. Details of weir 26 are depicted in FIG. 3. Weir 26 comprises an opening 162 in vertical line 22. In the preferred embodiment shown, opening 162 includes a "V"-shaped notch portion 164 extending downwardly. Also in the preferred embodiment, at least the lowermost section of notch portion 164, and preferably all of notch portion 164, is located below inlet line 106.

In the embodiment of tank outlet 400 shown in FIG. 6, tank outlet 400 comprises a horizontal line 402, a vertical conduit 404, an outlet box 406, and a discharge line 408. Horizontal line 402 provides fluid communication between clarified water zone 17 and vertical conduit 404. Vertical conduit 404 extends from horizontal line 402 to outlet box 406 and provides fluid communication therebetween.

As best seen in FIG. 7, outlet box 406 is divided into an inlet chamber 410 and an outlet chamber 412 by a chamber divider 414. Vertical conduit 404 is in fluid communication with the inlet chamber 410. Chamber divider 414 extends from the outlet box bottom 407 towards, but preferably not to, the outlet box top 409. Chamber divider 414 includes a top edge 416 with a notch 418, preferably also "V"-shaped, defined thereon. In the preferred embodiment, at least the lowermost section of notch 418 and preferably all of notch 418 is located below inlet line 106.

Discharge line 408 provides fluid communication between outlet chamber 412 and the exterior of system 10. Discharge line 408 is preferably located proximate outlet box bottom 407.

In one embodiment (as shown in FIGS. 6 and 7), vertical conduit 404, outlet box 406, and discharge line 408 are located exterior to tank 12. In this embodiment, horizontal line 402 extends through a tank side wall hole 413 so that vertical conduit 404, outlet box 406, and discharge line 408 are all exterior to tank 12.

In another embodiment (not shown), horizontal line 402, vertical conduit 404, and outlet box 406 are located interior to tank 12. Of course, the various relevant components located inside of tank 12 include passages to allow horizontal line 402, vertical conduit 404, and outlet box 406 to extend therethrough. In this embodiment, discharge line 408 extends from outlet box 406 interior of tank 12 through an opening in tank side wall 100 to the exterior of tank 12. This embodiment is useful because any leakage in the tank outlet 400 will leak interior to tank 12.

In the embodiment of tank outlet 400 shown in FIGS. 10 and 11, tank outlet 400 comprises a tank exit line 420 in fluid communication with the clarified water zone 17 through tank bottom 104.

Means for aerating 28 is provided in the suspended micromedia zone 14. Preferably, means for aerating 28 is located proximate support floor 116. Means for aerating 28 comprises different embodiments.

In one preferred embodiment as shown in FIGS. 1, 4, and 5, means for aerating 28 comprises at least one air outlet structure 200, each air outlet structure 200 connected to an air hose 208. Preferably, each air outlet structure 200 comprises a tubular ring 204 that includes a plurality of air passages 206 proximate support floor 116. Also preferably, each air outlet structure 200 is located interior to the vertical segment 122 of containment wall 120 but exterior to vertical pipe 20. In the preferred embodiment, each tubular ring 204 is concentric with the containment wall vertical segment 122 and the vertical pipe 20. An air hose 208 is attached to each air outlet structure 200 so that fluid communication is provided between air hose 208 and air outlet structure 200. Each air hose 208 is attached to an air pump (not shown) located external to tank 12. The air hoses 208 enter into tank 12 by means which are obvious and well-known in the art, such as an entry way through tank wall 100 or down one of the vertical passageways (pipe 20 or line 22).

In the preferred embodiment, at least one air outlet structure 200 comprises two tubular rings 204. Both tubular rings 204 in this embodiment are concentric with the containment wall vertical segment 122 and vertical pipe 20 and are mounted one on top of the other with a vertical gap defined between support floor 116 and the lowermost tubular ring 204 and a vertical gap defined between the two tubular rings 204. The plurality of air passages 206 of each tubular ring 204 are proximate support floor 116 so that the separating media 52 do not lodge and/or obstruct the air passages 206.

In the embodiment shown in FIGS. 6, 8, 9, and 11, means for aerating 28 comprises a diffuser 450 connected to an air line 452. Diffuser 450 is located within suspended micromedia zone 14 and is preferably a hollow cone member 454 having a narrow top surface 456 and a broader bottom surface 458 proximate support floor 116. Diffuser 450 also includes a plurality of openings 460 preferably on its bottom surface 458 so that the separating media 52 do not lodge and/or obstruct the air openings 460. Air line 452 is connected to diffuser top surface 456 and extends vertically upwards therefrom, preferably passing within chimney 18, through an opening of tank top 102 to outside the tank 12. Air line 452 is attached to an air pump (not shown).

In the embodiment of means for aerating 28 shown in FIG. 10, means for aerating 28 comprises an air header 480 connected to an air inlet 482. Air header 480 is located within suspended micromedia zone 14 and preferably comprises a transverse hollow tube 484 with a plurality of passages 486 thereon. Transverse hollow tube 484 can be straight or circular. Air inlet 482 is connected to transverse hollow tube 484 and extends through tank 12, preferably tank side wall 100. Preferably, tube passages 486 are proximate support floor 116 so that the separating media 52 do not lodge and/or obstruct the tube passages 486.

Support floor 116 includes a media retaining mechanism 220. Media retaining mechanism 220 prohibits the passage of separating media 52, but allows the passage of liquid wastewater therethrough. Media retaining mechanism 220 is therefore constructed from material that enables such relative passage. In this way, media retaining mechanism 220 provides fluid communication between suspended micromedia zone 14 and clarified water zone 17.

In the embodiment of media retaining mechanism 220 shown in FIGS. 1, 4, and 5, media retaining mechanism 220 comprises a plurality of retaining elements 221 each attached through a support floor opening 117 to support floor 116. Each retaining element 221 is preferably vertically mounted in relation to support floor 116. The actual material of each retaining element 221 is disposed on the retaining element body 222 and not on the retaining element top 224 or bottom 226. In the preferred embodiment, support floor openings 117 are equally spaced about vertical pipe 20 so that retaining elements 221 are also equally spaced about vertical pipe 20. In the embodiment including tubular rings 204, the retaining elements 221 are situated intermediate tubular rings 204 and vertical pipe 20.

In the embodiment of media retaining mechanism 220 shown in FIG. 6, media retaining mechanism 220 comprises a media retention basket 500 constructed of the appropriate material. Media retention basket 500 is attached at its top end 502 to support floor 116. Support floor 116, in this embodiment, includes a substantial cutout 121, to which media retention basket 500 is attached. It is noted that separating media 52 extend into but not through media retention basket 500 so that the interior of the media retention basket 500 can be said to be a part of the suspended micromedia zone 14. Media retention basket 500 also has a bottom end 504 which is preferably spaced from tank bottom 104.

In the embodiment of media retaining mechanism 220 shown in FIGS. 10 and 11, media retaining mechanism 220 comprises a plurality of media retaining screens 520 spread out on support floor 116. Support floor 116, in this embodiment, must also include passages 123 to enable fluid communication through media retaining screens 520.

In one embodiment of tank 12 (see FIG. 1), access opening 154 is provided centrally of top 102. Access opening 154 is of sufficient size to allow access to the interior of tank 12 for maintenance purposes, including replacement of components. Housing is provided around opening 154. A housing cover is removably supported on the housing.

System 10 may also include an overflow line 530 such as that shown in FIG. 6. Overflow line 530 extends through tank side wall 100 and is preferably at the same or a lower vertical height as inlet line 106. In the embodiment shown in FIG. 6, overflow line 530 extends into outlet box 406, preferably into outlet chamber 412.

Furthermore, system 10 may include a contra flow mechanism 550, such as those shown in FIGS. 6 and 10. Contra flow mechanism 550 is in fluid communication with clarified water zone 17 and enables the air pressurization of clarified water zone 17 so as to re-suspend the separating media 52 of suspended micromedia zone 14. In the embodiment shown in FIG. 6, contra flow mechanism 550 comprises an air supply line 552 and a blower (not shown). Air supply line 552 extends from tank top 102 through and within air line 452, through diffuser 450 and through media retention basket 500. Thus, air supply line 552 provides fluid communication between a blower located exterior to tank 12 and clarified water zone 17. In the embodiment shown in FIG.

10, contra flow mechanism 550 comprises an air supply pipe 554 that is in fluid communication with tank bottom 104 and thus clarified water zone 17 and with a blower.

In addition, system 10 may include a heat recovery device or radiator 560 (see FIG. 11) functionally attached to the means for aerating 28. Radiator 560 heats the air that is injected by means for aerating 28. A heater can also be added to increase the temperature in extreme climates.

In Operation

Wastewater (not shown) to be treated is introduced into tank 12 through inlet line 106. Such wastewater typically includes organic solids mixed with water as well as suspended solids and may also include inorganic solids. In the embodiment in which inlet pipe 108 is in fluid communication with anaerobic treatment zone 11 (see FIG. 1), wastewater introduced into tank 12 flows within inlet pipe 108 into anaerobic zone 11. In the embodiments not including anaerobic treatment zone 11, wastewater introduced into tank 12 eventually falls by gravity to suspended micromedia zone 14. It is noted that in the embodiments of system 10 not including anaerobic treatment zone 11, although anaerobic treatment zone 11 is not part of system 10, the wastewater could have been treated by anaerobic bacteria prior to entering system 10 as defined herein.

In the embodiment including anaerobic treatment zone 11, flow out of anaerobic zone 11 is limited to the gaps 125 included on the outer edge 126 of inclined segment 124 of containment wall 120. Flow within anaerobic zone 11 is limited as wastewater is introduced intermittently and as the aggregate area of the gaps 125 is relatively small in relation to the volume of anaerobic zone 11. Such limited flow allows for settling of organic and inorganic solids from the mixture of solids and liquids, resulting in accumulation and digestion of sludge (not shown) within anaerobic zone 11 over time.

Because relatively small quantities of air can be transmitted from the wastewater into anaerobic zone 11 and because anaerobic zone 11 is physically separated from means for aerating 28 by containment wall 120, anaerobic bacteria act upon the wastewater and sludge contained in anaerobic treatment zone 11. Such anaerobic action is known in the art, and may be initially stimulated by processes known in the art. Among other by-products, hydrogen sulfide and methane are produced as a result of such anaerobic processes.

From time to time, sludge accumulated within anaerobic zone 11 may be manually removed by removing tank top 102 and pumping the sludge through pipe upper end 110. The pumping action may be performed by a sewage pump truck (not shown) according to methods well known in the industry.

It can be seen that introduction of sufficient wastewater into anaerobic zone 11 ultimately forces flow of wastewater out of anaerobic zone 11 through gaps 125 on containment wall 120. Wastewater flowing from anaerobic zone 11 retains suspended organic solids and microscopic organisms. Such wastewater becomes mixed and recirculated with other wastewater within tank 12 and is forced to and through the suspended micromedia zone 14 as more wastewater is added.

Thus, in both the embodiments that includes an anaerobic treatment zone 11 and the embodiments that does not include an anaerobic treatment zone 11, wastewater is eventually introduced into suspended micromedia zone 14.

Air (not shown) is introduced into tank 12 through means for aerating 28 on a continuous basis. In the embodiment of means for aerating 28 including tubular rings 204, air passages 206, and air hoses 208, the air flows into tank 12 through air hoses 208, into tubular rings 204, and out of tubular rings 204 through air passages 206. In the embodiment of means for aerating 28 including diffuser 450 and air line 452, the air flows into tank 12 through air line 452, into diffuser 450, and out of diffuser 450 through diffuser openings 460. In the embodiment of means for aerating 28 including air header 480 and air inlet 482, the air flows into tank 12 through air inlet 482 into air header 480, and out of air header 480 through air header passages 486. Because the air passages 206, the diffuser openings 460, and the header passages 486 are proximate support floor 116, separating media 52 normally do not obstruct and/or lodge on such orifices.

The air then bubbles up through the separating media 52 of suspended micromedia zone 14 providing agitation of the separating media 52 and intimate subjection of the wastewater to the oxygen of the air flow. Such agitation has the beneficial effect of dislodging organic matter (not shown) which may accumulate within the suspended micromedia zone 14. The separating media 52 enhances the transfer of energy from the air flow to the wastewater thereby improving mixing therebetween. In addition, the separating media 52 aids in particle attrition to reduce the size of the suspended solids and increase the readily available nutrients.

Because the means for aerating 28 is located below hood 132, the air bubbling up therefrom is carried upward through the separating media 52 and through the annular area interior of chimney 18, thereby creating flow of mixed liquid and air upwardly through chimney 18. At this point, most of the separating media 52 falls back into the suspended micromedia zone 14. However, some of the separating media 52 is energized by the air flow and is stirred and carried up with the mixed liquid/air into the chimney 18. The upward flow of mixed liquid/air and energized separating media 52 through chimney 18 continues rising ultimately reaching the upper end 140 of chimney 18. The separating media 52 which percolates through the fixed media 16 scours the old growth bacteria, accelerating new bacteria growth.

In the embodiments shown in FIGS. 1, 6, and 10, the upward flow overflows at the upper end 140 of chimney 18 into aerobic treatment zone 13. Tank top 102 (or the outwardly extending flange in the relevant embodiment) limits upward flow of mixed liquid/air and energized separating media 52, diverting such flow outwardly into aerobic treatment zone 13.

In the embodiment shown in FIG. 11, the upward flow of mixed liquid/air and energized separating media 52 flows through lateral conduit 137 (or on the horizontal tray in the relevant embodiment) and into container 300 falling on external aerobic treatment zone 13.

The separating media 52 within suspended micromedia zone 14 also act to reduce the size of the air bubbles (and increase the number of air bubbles) being generated by the means for aerating 28 since the bubbles must be broken down in size in order to ascend through the separating media 52. By reducing the size and increasing the number of the air bubbles, the separating media 52 also acts to maximize the surface area contact between the oxygen in the air bubbles and the wastewater in the upward moving flow and in the aerobic treatment zone 13. Normal rates of oxygen content in aerobic treatment zones of prior art systems are approximately 5.5 ppm of dissolved oxygen. The present invention is able to provide 8.0 ppm of dissolved oxygen in aerobic treatment zone 13. The higher the oxygen content in an aerobic treatment zone; the greater the aerobic bacteria growth; and the cleaner the water.

It is further noted that a direct correlation exists between the depth of the means for aerating 28 and the oxygen transfer into the wastewater. The greater the depth; the more pressure the air bubbles are under at the point of insertion; and the greater the oxygen transfer into the wastewater.

As previously stated, fixed media 16 provides extensive surface area for growth and retention of aerobic bacteria in aerobic treatment zone 13. Thus, in aerobic treatment zone 13, such aerobic bacteria act upon the organic solids in suspension in the wastewater and upon the hydrogen sulfide, methane and other organic by-products of anaerobic treatment in anaerobic treatment zone 11 (in the relevant embodiment).

The energized separating media 52 carried upward in the water column within chimney 18 percolates through aerobic treatment zone 13 and acts as an abrasion to remove older aerobic bacterial growth from fixed media 16. As aerobic bacteria grows on the fixed media 16 of aerobic treatment zone 13, the new bacteria growth reduces the oxygen supply to the older bacteria growth that is attached to the fixed media 16. Such downward moving separating media 52 dislodge and scour the older bacteria growth thus accelerating the growth of new bacteria or biomass.

Because fixed media 16 allows flow therethrough, wastewater, including the contents that percolated through aerobic treatment zone 13, then percolates downwardly from aerobic treatment zone 13 and through media support 130. Ultimately, in the embodiments shown in FIGS. 1, 6, and 10, wastewater from fixed media 16 re-enters suspended micromedia zone 14 by hydraulic pressure differential. In the embodiment shown in FIG. 6, the wastewater passes into suspended micromedia zone 14 through hood gaps 139. In the embodiment shown in FIG. 11, wastewater from fixed media 16 passes out of container 300 back into tank 12 through return 2 line 350, which return line 350 directs the wastewater back to suspended micromedia zone 14. Thus, in all embodiments, the energized separating media 52 which percolated from aerobic treatment zone 13 re-settles within suspended micromedia zone 14.

At all times, a portion of the wastewater within suspended micromedia zone 14 flows by hydraulic pressure differential and enters media retaining mechanism 220 through the media retaining mechanisms' 220 permeable material. Such clarified water next continues downwardly into the clarified water zone 17.

In the embodiment of tank outlet 400 shown in FIG. 1, due to hydrostatic pressure, as will be explained herein, the clarified water is then forced upwards within vertical pipe 20. Clarified water continues to be forced upwards within vertical pipe 20 until it reaches the weir 26 of vertical line 22. Through weir 26, clarified water flows from vertical pipe 20 into vertical line 22. Within vertical line 22, clarified water flows downwardly and exits tank 12 and water treatment system 10 through outlet line 24.

As previously disclosed herein, at least the lowermost section of notch portion 164, and preferably all of notch portion 164, is located below inlet line 106. Such a construction and relative placement ensures that, due to hydrostatic pressure, the wastewater column within vertical pipe 20 will always be "tall" enough to overflow into vertical line 22 and ultimately out of tank 12 through outlet pipe 24. In addition, such construction and relative placement enables the system 10 to function without a wastewater circulation pump.

In the embodiment of tank outlet 400 shown in FIG. 6, hydrostatic pressure also acts to force the clarified water out of system 10. In this instance, clarified water is forced through horizontal line 402 and upwards within vertical conduit 404 until it reaches the notch 418 of chamber divider 414. Through notch 418, clarified water flows from vertical conduit 404 into outlet chamber 412 of outlet box 406. From outlet chamber 412, clarified water flows out of system 10 through discharge line 408.

As previously disclosed herein, at least the lowermost section of notch 418, and preferably all of notch 418, is located below inlet line 106. Such a construction and relative placement ensures that, due to hydrostatic pressure, the wastewater column within vertical conduit 404 will always be "tall" enough to overflow into outlet chamber 412 and ultimately out of tank 12 through discharge line 408. In addition, such construction and relative placement enables the system 10 to function without a wastewater circulation pump.

In the embodiment of tank outlet 400 shown in FIGS. 10 and 11, pressure acts to force the clarified water out of system 10 by way of tank exit line 420 proximate tank bottom 104. To further control the egress of clarified water from tank 12, a flow valve and/or a pump can also be functionally attached to tank exit line 420.

It is noted that because air is continuously supplied by means for aerating 28, aerobic treatment of the wastewater within the relevant parts of tank 12 is continuous and cumulative. If chlorination of clarified water is desired, chlorination may be provided in vertical line 22 by insertion of chlorination tablets at upper end 152 of vertical line 22.

In the embodiment including a heat recovery device or radiator 560 (see FIG. 11), radiator 560 heats the air that is injected by means for aerating 28. It has been found that the aerobic bacteria within the aerobic treatment zone 13 are more active when exposed to warmer temperatures. Radiator 560 ensures that the air contacting the aerobic bacteria is warm and thus generates greater activity in the bacteria. Preferably, radiator 560 is set so that the air contacting the aerobic bacteria is between 70° F.–90° F. Use of the radiator 560 and or the heater is particularly helpful in colder environments, where it is tough, if not impossible, to maintain warm temperatures by non-artificial means.

If system 10 is obstructed, then wastewater begins to rise within suspended micromedia zone 14 and aerobic treatment zone 13. In the embodiment of system 10 including overflow line 530, wastewater continues rising until it is at the level of the overflow line 530, which is preferably at the same or a lower vertical height as the inlet line 106. At this point, wastewater will exit out of the overflow line 530, preventing any reverse flow out of inlet line 106. It is noted that the wastewater enters outlet chamber 412 and continues out of tank 12 by way of discharge line 408 thereby contaminating the clarified water normally flowing therein. Thus, if an overflow situation occurs, the clarified water exiting by discharge line 408 is contaminated and must be re-injected into a properly functioning system 10.

Should the micromedia zone 14 become compacted, either through blower failure, power outage, or at start-up, then the contra flow mechanism 550 (in the relevant embodiment) can be used to resuspend the separating media 52. First, air must be injected into clarified water zone 17 through air line 552 (see FIG. 6) or air pipe 554 (see FIG. 10) so as to pressurize clarified water zone 17. The pressure increasing within clarified water zone 17 will serve to lift and expand the separating media 52 of suspended micromedia zone 14. Once the suspended micromedia zone 14 is expanded, the pressurization is stopped and normal operation is resumed.

It is noted that the embodiment of system 10 in which aerobic treatment zone 13 is exterior to tank 12 and is in container 300 is useful for easily cleaning the aerobic treatment zone 13 (removing debris accumulation, excess biomass, etc.). In addition, such embodiment is useful to enable the retrofitting of existing wastewater treatment systems into system 10.

The foregoing disclosure and description of the invention is illustrative and explanatory thereof. Various changes in the details of the illustrated construction may be made within the scope of the appended claims without departing from the spirit of the invention. The present invention should only be limited by the following claims and their legal equivalents.

What is claimed:

1. A treatment system for treating the liquid in waste, comprising:
    a tank having a tank inlet and a tank outlet;
    wherein waste, including waste liquids and waste solids, flows into said tank through said tank inlet and said waste liquids flow out of said tank through said tank outlet;
    an aerobic treatment zone including aerobic treatment bacteria;
    a suspended micromedia zone including separating media;
    said aerobic treatment zone in fluid communication with said suspended micromedia zone;
    means for aerating said suspended micromedia zone wherein a plurality of air bubbles are injected into said suspended micromedia zone and continue to said aerobic treatment zone; and
    a media retaining mechanism for retaining said separating media within said suspended micromedia zone and allowing the passage of at least a portion of said waste liquids that have passed through said suspended micromedia zone.

2. A treatment system as in claim 1, wherein said air bubbles agitate said separating media and create a flow of at least a portion of said waste and said air bubbles from said suspended micromedia zone to said aerobic treatment zone causing at least some of said separating media to be transported into said aerobic treatment zone.

3. A treatment system as in claim 2, wherein said separating media act to reduce the size and increase the number of said air bubbles as said air bubbles rise through said suspended micromedia zone.

4. A treatment system as in claim 2, wherein said flow contacts said aerobic treatment bacteria in said aerobic treatment zone and continues back to said suspended micromedia zone thereafter.

5. A treatment system as in claim 4, wherein said separating media passing through said aerobic treatment zone act to scour the old growth of said aerobic treatment bacteria.

6. A treatment system as in claim 1, wherein said aerobic treatment zone is located interior to said tank.

7. A treatment system as in claim 1, wherein said aerobic treatment zone is located exterior to said tank.

8. A treatment system as in claim 1, further comprising an anaerobic treatment zone in fluid communication with said suspended micromedia zone.

9. A treatment system as in claim 1, further comprising an overflow line allowing the egress of said waste out of said tank in circumstances when said system is obstructed.

10. A treatment system as in claim 1, further comprising:
    a clarified water zone receiving said waste liquids that pass through said media retaining mechanism;
    a contra flow mechanism in fluid communication with said clarified water zone; and
    said contra flow mechanism enabling the air pressurization of said clarified water zone so as to resuspend said separating media in said suspended micromedia zone through said media retaining mechanism.

11. A treatment system as in claim 1, further comprising:
    a radiator functionally attached to said means for aerating; and
    said radiator heating said air injected by said means for aerating.

12. A treatment system as in claim 1, wherein:
    said aerobic treatment zone including fixed media therein;
    said fixed media comprising substantially rigid material having sufficient voids to allow vertical and lateral flow therethrough; and
    said aerobic treatment bacteria growing on said fixed media.

13. A treatment system as in claim 1, further comprising:
    a chimney providing fluid communication between said suspended micromedia zone and said aerobic treatment zone; and
    said chimney located above and spaced from said suspended micromedia zone.

14. A treatment system as in claim 1, wherein:
    said means for aerating comprising at least one tubular ring connected to an air hose, said air hose attached to an air pump; and
    each of said at least one tubular ring located within said suspended micromedia zone and including a plurality of air passages.

15. A treatment system as in claim 1, wherein:
    said means for aerating comprising a diffuser connected to an air line, said air line attached to an air pump;
    said diffuser comprising a hollow cone member including a plurality of openings; and
    said diffuser located within said suspended micromedia zone.

16. A treatment system as in claim 1, wherein:
    said means for aerating comprising an air header connected to an air inlet, said air inlet attached to an air pump;
    said air header comprising a transverse hollow tube including a plurality of passages; and
    said air header located within said suspended micromedia zone.

17. A treatment system as in claim 1, wherein said media retaining mechanism comprising a plurality of vertically mounted media retaining elements.

18. A treatment system as in claim 1, wherein said media retaining mechanism comprising a media retention basket.

19. A treatment system as in claim 1, wherein said media retaining mechanism comprising a plurality of media retaining screens.

\* \* \* \* \*